(No Model.)
E. DIEMER.
FRAME FOR ARTIFICIAL FLOWERS.
No. 490,642. Patented Jan. 31, 1893.
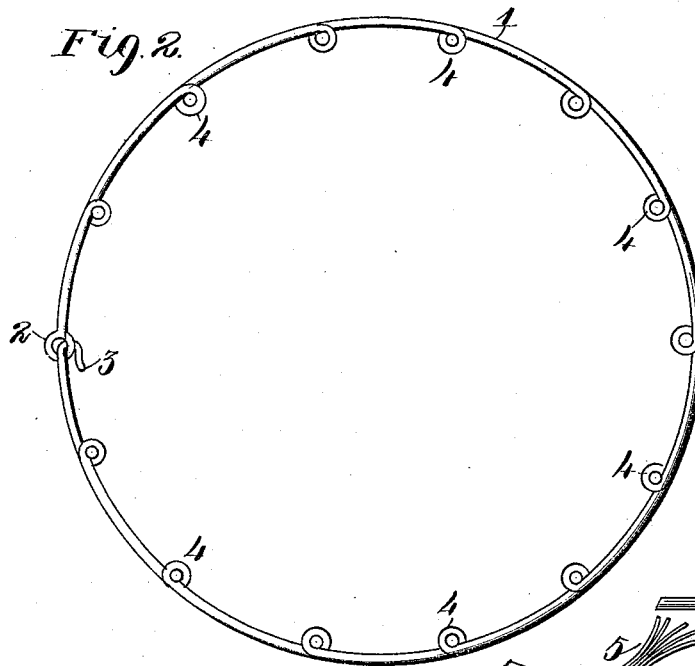
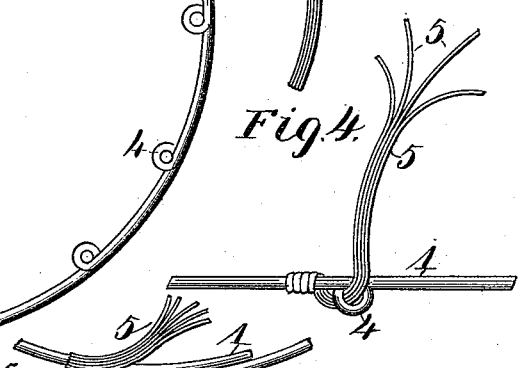
Witnesses
Inventor
Emil Diemer.
By his Attorneys

UNITED STATES PATENT OFFICE.

EMIL DIEMER, OF ST. LOUIS, MISSOURI.

FRAME FOR ARTIFICIAL FLOWERS.

SPECIFICATION forming part of Letters Patent No. 490,642, dated January 31, 1893.

Application filed October 10, 1892. Serial No. 448,380. (No model.)

*To all whom it may concern:*

Be it known that I, EMIL DIEMER, of the city of St. Louis, State of Missouri, have invented certain new and useful Improvements in Frames for Artificial Flowers, of which the following is a full, clear, and exact description, reference being had to the accompanying drawings, forming a part hereof.

My invention relates to improvements in frames for artificial flowers, and consists in the novel arrangement and combination of parts more particularly set out in the specification and covered by the claims.

In the drawings Figure 1 is a top plan view of my invention showing the flowers arranged upon the frame; Fig. 2 is a top plan view of the frame, the ends of the same being united; Fig. 3 is a perspective view of a tuft of flowers as they are arranged upon the frame; Fig. 4 is an enlarged detail view of a portion of the frame showing a tuft attached thereto; and Fig. 5 is a top plan view of the frame and a tuft attached thereto showing a modification of my invention.

The object of my invention is to construct a frame to which tufts of flowers may be readily attached at predetermined distances apart after which the wires forming the stems of the flowers may be bent in any desirable manner that the leaves or flowers borne by the stems may wholly cover said frame.

It further consists in details more particularly hereinafter described.

Referring to the drawings 1 represents a length of wire preferably of a single piece one end of which is provided with an eye 2 and the opposite end of said wire formed into a hook 3 which hook is received by the said eye when it is desired to unite the ends and form a common band or ring as shown in Fig. 2. Formed in the said wire 1 intermediate of its ends are any number of loops 4 which are preferably arranged at predetermined distances apart and provide means for attaching the tufts in a manner hereinafter described. The loops formed in the said wire 1 also render the same flexible which has a tendency to prevent the ends of the said wire from being released under ordinary circumstances.

The leaves and flowers are stamped from any suitable material and are ornamented to resemble the natural flowers and leaves, and to the same are attached short wires 5 forming stems for the same and means for attaching the same to the frame 1. The leaves together with their stems 5 are arranged in tufts as shown in Fig. 3 and their free ends passed through the loops 4 forming the band 1 after which the same are twisted around the band for temporarily attaching the same as best shown in Fig. 4.

A frame constructed in the manner described and provided with flowers and leaves constitutes a wreath, but should a string of flowers be desired the ends of the band 1 may be easily disconnected and laid open, and made to conform to any desirable shape. It may be found desirable in some instances to reduce the size of the wreath which can be accomplished by passing the hook 3 formed on one end of the wire in any one of the loops 4 provided said loop has its tuft of flowers removed.

In Fig. 5 I have shown a modification of my invention in which the ends of the wire 1 overlap one another and are permanently united by solder. I have also shown in said figure the ends of the wires 5 united to the wire 1 by soldering which construction may be found desirable in some instances.

By the use of the loops 4 and the hook 3 the wreath shown in Fig. 1 may be made to assume any desirable length, and the form and outline of the same be made variable, and the flowers and leaves be detached at will.

Having fully described my invention, what I claim is,

1. A frame for artificial flowers comprising a band, loops formed in the band and forming a continuation of the same and short wires arranged in tufts passed through said loops and twisted around the said band, said short wires forming stems for attaching suitable leaves and flowers, substantially as set forth.

2. A frame for artificial flowers consisting of a wire 1, an eye 2 formed in one end of the same, a hook 3 formed at the opposite end of said wire for uniting said ends, loops 4 formed in the said wire intermediate its ends at predetermined distances apart, and short wires 5 arranged in tufts having their ends passed through the said loops 4, and wrapped around the wire 1, the said wires constituting stems for suitable leaves and flowers, substantially as set forth.

In testimony whereof I affix my signature in presence of two witnesses.

EMIL DIEMER.

Witnesses:
FRED. KOCH,
JAMES J. O'DONOHOE.